(12) United States Patent
Saje et al.

(10) Patent No.: US 9,994,070 B2
(45) Date of Patent: Jun. 12, 2018

(54) MULTI-HUB WHEEL ASSEMBLY FOR MOTOR VEHICLES

(71) Applicant: GM GLOBAL TECHNOLOGY OPERATIONS LLC, Detroit, MI (US)

(72) Inventors: Robert N. Saje, Shelby Township, MI (US); Michael E. Quigley, Washington Township, MI (US); Giles D. Bryer, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/217,175

(22) Filed: Jul. 22, 2016

(65) Prior Publication Data

US 2018/0022153 A1    Jan. 25, 2018

(51) Int. Cl.
*B60B 27/00* (2006.01)
*B60B 3/02* (2006.01)
*B60B 3/00* (2006.01)
*B62D 7/18* (2006.01)

(52) U.S. Cl.
CPC .............. *B60B 27/00* (2013.01); *B60B 3/004* (2013.01); *B60B 3/02* (2013.01); *B62D 7/18* (2013.01); *B60B 2320/10* (2013.01); *B60B 2360/10* (2013.01); *B60B 2900/111* (2013.01); *B60B 2900/112* (2013.01)

(58) Field of Classification Search
CPC .. B60L 27/00; B60L 3/004; B60L 3/02; B60L 2900/112; B60L 2900/111; B60L 2360/10; B60L 27/0047; B60L 27/0052; B62D 7/18

USPC ..... 301/6.1, 6.7, 6.8, 63.109, 105.1, 37.105; 188/218 A

See application file for complete search history.

(56) References Cited

U.S. PATENT DOCUMENTS

| | | | |
|---|---|---|---|
| 6,173,821 B1 * | 1/2001 | Herffurth | B60T 1/065 188/18 A |
| 8,914,977 B2 * | 12/2014 | Furukawa | B21D 53/30 29/894 |
| 9,150,070 B2 | 10/2015 | Luttinen et al. | |
| 2003/0015909 A1 * | 1/2003 | Meek, Jr. | B60B 19/00 301/10.1 |
| 2008/0053762 A1 * | 3/2008 | Nakamura | F16D 55/00 188/218 A |

(Continued)

*Primary Examiner* — S. Joseph Morano
*Assistant Examiner* — Jean Charleston
(74) *Attorney, Agent, or Firm* — Quinn IP Law

(57) ABSTRACT

Disclosed are wheel assemblies for motor vehicle powertrains, methods for making and methods for using wheel assemblies, and motor vehicles with wheel units each composed of a tire and a wheel assembly. For example, a multi-hub wheel assembly for a motor vehicle is disclosed. The motor vehicle includes a tire and a suspension component, such as a hub-and-bearing assembly, mounted to the vehicle body. The wheel assembly includes an outer wheel with an annular rim well attached to a central hub. The central hub mounts onto the vehicle's suspension component, e.g., via lugs and bolts, while the tire mounts onto the rim well. The wheel assembly also includes an intermediate hub with a deflection annular rim attached to a mounting base. The mounting base is attached to the outer wheel. The intermediate hub mounts inside a hollow core of the outer wheel, interposed between the central hub and the suspension component.

20 Claims, 2 Drawing Sheets

(56) References Cited

U.S. PATENT DOCUMENTS

| | | | |
|---|---|---|---|
| 2010/0187052 A1* | 7/2010 | Matsubayashi | B62J 15/00 188/218 A |
| 2015/0001823 A1 | 1/2015 | Saje et al. | |
| 2015/0001891 A1 | 1/2015 | Saje et al. | |
| 2015/0001892 A1 | 1/2015 | Saje et al. | |
| 2015/0251615 A1 | 9/2015 | Cheng et al. | |

* cited by examiner

MULTI-HUB WHEEL ASSEMBLY FOR MOTOR VEHICLES

TECHNICAL FIELD

The present disclosure relates generally to powertrain systems for motor vehicles. More specifically, aspects of this disclosure relate to wheel hubs for corner assemblies of motor vehicles.

BACKGROUND

Conventional motor vehicles, such as the modern-day automobile, include a powertrain that operates to propel the vehicle and power the onboard vehicle electronics. The powertrain, which is inclusive of and sometimes improperly referred to as a "drivetrain," is generally comprised of an engine that delivers driving power to the vehicle's final drive system (e.g., rear differential, axle, and wheels) through a multi-speed power transmission. Automobiles have traditionally been powered by a reciprocating-piston type internal combustion engine (ICE) because of its ready availability and relatively inexpensive cost, light weight, and overall efficiency. Such engines include two or four-stroke compression-ignited diesel engines and four-stroke spark-ignited gasoline engines. Hybrid vehicles, on the other hand, utilize alternative power sources, such as fuel cells or electric motor-generators, to propel the vehicle, minimizing reliance on the engine for power and increasing overall fuel economy.

A wheel unit of a contemporary motor vehicle is typically a pneumatic assembly with a synthetic-rubber tire fitted onto the rim of a metallic wheel. To ensure consistent road handling, steering and vehicle braking, each wheel unit is connected to the frame (e.g., body in white (BIW)) of the vehicle through a suspension system that generally comprises a collaboration of springs, shock absorbers, and linkages. For instance, the front corner assembly of a conventional rear-wheel drive automobile employs a steering knuckle with a spindle onto which a hub and a brake rotor are rotatably mounted. Inboard contact points of the knuckle are coupled to the vehicle body, e.g., via a control arm, strut damper, and tie rod, whereas the outboard end is coupled to the wheel hub, e.g., via the spindle and hub. The wheel unit rotates and steers on the knuckle, spindle, and tie rod, while being held in a stable plane of motion by the knuckle, strut, and control arm.

SUMMARY

Disclosed herein are wheel assemblies for motor vehicle powertrains, methods for making and methods for using wheel assemblies, and motor vehicles with a wheel unit including a tire and a wheel assembly. By way of example, and not limitation, an improved multi-hub structural wheel (or "wheel assembly") for a front corner assembly of a motor vehicle is disclosed. In an embodiment, the multi-hub structural wheel is composed of a rigid outer wheel (or "spoke component"), onto which a polymeric tire is mounted, and an intermediate hub, which is mounted inside the outer wheel interposed between the corner assembly's suspension components (i.e., knuckle, hub-and-bearing assembly, etc.) and the central hub of the outer wheel. The outer wheel is fabricated from a lower strength material (e.g., cast aluminum) that can be easily formed, for example, to provide styled shapes and adequate stiffness. The intermediate hub, in contrast, is fabricated from a higher strength material (e.g., high-strength low-alloy (HSLA) steel) used, for example, to manage external loading conditions, such as a shallow offset frontal load. Optional intermediate hub geometries can include an oblique deflection rim and/or a convex mounting base that can help to deflect the front corner assembly outboard of the vehicle body during external loading conditions.

Attendant benefits for at least some of the disclosed concepts include helping to prevent a front corner assembly from penetrating a passenger compartment foot well during external loading conditions. The high strength intermediate hub, for example, can be loaded to geometrically engage the rocker and thereby cause outboard movement of the front corner assembly. The mixed-material wheel configuration can also provide for freedom in styling of the outer A-side appearance of the wheel unit, while maintaining sufficient radial and transverse wheel stiffness to prevent unwanted deformation during external loading.

Aspects of the present disclosure are directed to wheel units for motor vehicle powertrains. For example, a wheel assembly for a motor vehicle is disclosed. The motor vehicle includes a vehicle body with a tire and a suspension component mounted directly or indirectly to the vehicle body. The wheel assembly, which may be a bipartite construction or an integrally formed unit, includes an outer wheel and an intermediate hub. This outer wheel includes a rim well that is attached to a central hub to cooperatively define a hollow core. The central hub is configured to mount onto the motor vehicle's suspension component, which may be a hub-and-bearing assembly that is rotatably mounted to a steering knuckle. The rim well, in contrast, is configured to mount thereon the tire. The intermediate hub is integrally formed with or otherwise attached to the outer wheel, e.g., via the lugs of the hub-and-bearing assembly. The intermediate hub includes a deflection rim that is attached to a mounting base. The intermediate hub is configured to mount inside the hollow core of the outer wheel, interposed between the central hub and the suspension component, e.g., to provide additional stiffness and control movement of the wheel assembly under external loading.

Other aspects of the present disclosure are directed to motor vehicles with powertrains including plural wheel units. A "motor vehicle," as used herein, may include any relevant vehicle platform, such as passenger vehicles (internal combustion engine (ICE), hybrid, electric, fuel cell, etc.), industrial vehicles, buses, all-terrain vehicles (ATV), farm equipment, etc. In one example, a motor vehicle is disclosed that includes a vehicle body with a wheel well, and a corner assembly mounted partially or entirely within the wheel well. The corner assembly includes, among other things, a tire, a steering knuckle, a hub-and-bearing assembly, and a multi-hub wheel. The steering knuckle is mounted to the vehicle body inside the wheel well, whereas the hub-and-bearing assembly is rotatably mounted to the steering knuckle.

The multi-hub wheel includes a rigid outer wheel, e.g., that is fabricated from a first material with a first structural strength, and a rigid intermediate hub, e.g., that is fabricated from a second material with a second structural strength distinct from the first hardness. The outer wheel includes an annular rim well that is attached to a central hub via a rim star to define a hollow core. The central hub of the outer wheel is mounted onto the hub-and-bearing assembly, whereas the tire is mounted onto the outer wheel's rim well. The intermediate hub includes an annular deflection rim that is attached to and projects obliquely from a toroidal mounting base. The mounting base is mounted on the hub-andbearing assembly such that the intermediate hub is mounted inside the hollow core of the outer wheel, interposed between the central hub and the steering knuckle, e.g., to provide additional stiffness and control movement of the wheel assembly under external loading.

According to other aspects of the present disclosure, methods of making and methods of using vehicle wheel assemblies are presented. For instance, a method of constructing a wheel assembly for a motor vehicle is disclosed. The motor vehicle includes a vehicle body, a tire, and a suspension component mounted directly or indirectly to the vehicle body. The method includes: providing an outer wheel with a rim well attached to a central hub to define a hollow core, wherein the central hub is configured to mount on the suspension component of the motor vehicle, and the rim well is configured to mount thereon the tire; and attaching an intermediate hub to the outer wheel, the intermediate hub including a deflection rim attached to a mounting base, wherein the intermediate hub is configured to mount inside the hollow core of the outer wheel, interposed between the central hub and the suspension component, e.g., to provide additional stiffness and control movement of the wheel assembly under external loading.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
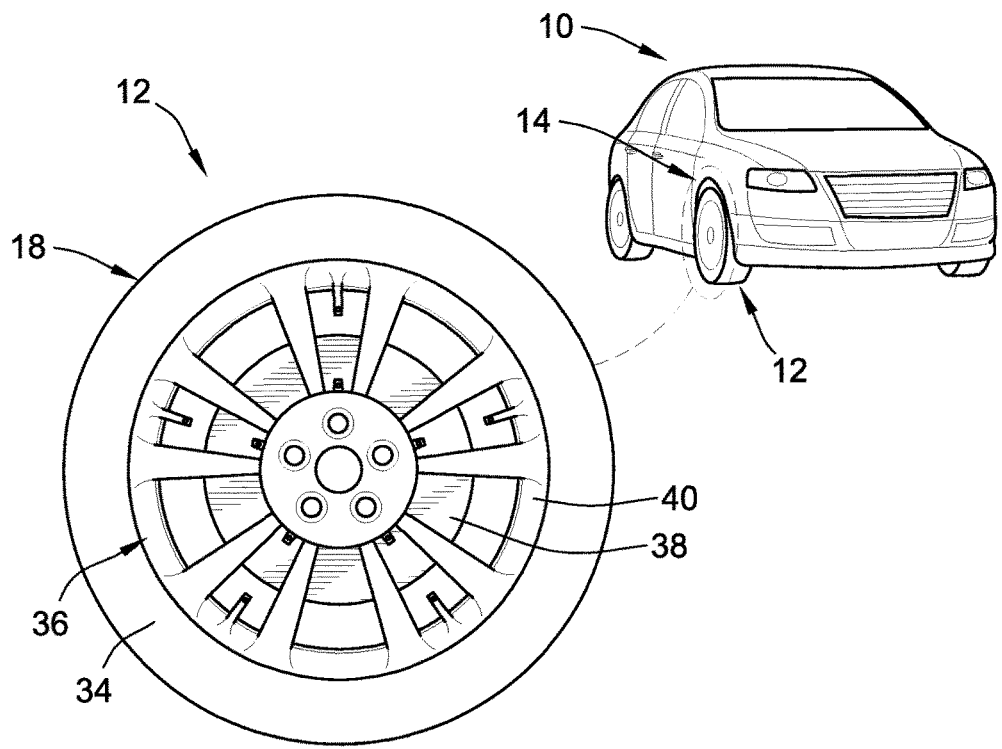
FIG. 1 is a front perspective-view illustration of a representative motor vehicle with a front corner assembly including a multi-hub wheel assembly in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a perspective-view illustration of a representative automobile, designated generally at 10, with an arrangement of wheel corner assemblies, which are collectively represented herein by a front corner assembly 12. Mounted at a forward portion of the automobile 10, e.g., aft of a front bumper fascia and forward of a passenger door, the front corner assembly 12 is wholly or partially positioned within a wheel well that is defined in part by a front fender panel 14. The illustrated automobile 10—also referred to herein as "motor vehicle" or "vehicle" for short—is merely an exemplary application with which the novel aspects of this disclosure can be practiced. In the same vein, the implementation of the present concepts into a front corner assembly should also be appreciated as an exemplary application of the novel concepts disclosed herein. As such, it should be understood that the aspects and features of the present disclosure can be integrated into other wheel corner assemblies and utilized for any type of motor vehicle. Lastly, the drawings presented herein, are not necessarily to scale and are provided purely for instructional purposes. Thus, the specific and relative dimensions shown in the drawings are not to be construed as limiting.

Figure 2:
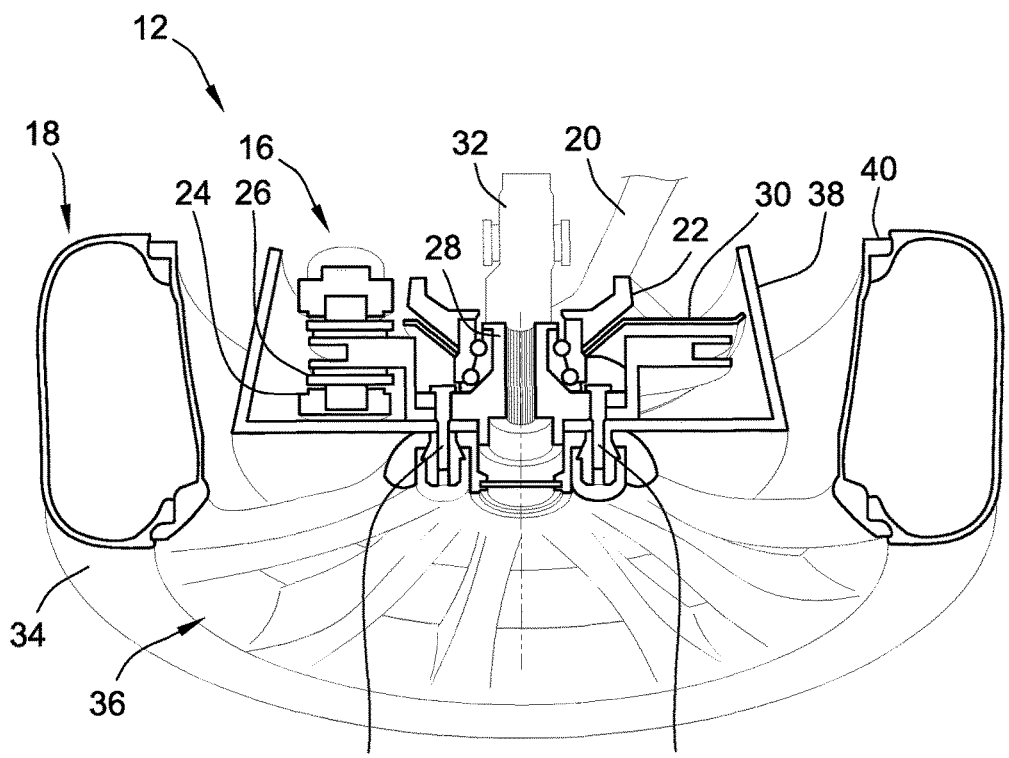
FIG. 2 is a top perspective-view illustration of the front corner assembly of FIG. 1 shown partially cut away to better illustrate the representative multi-hub wheel assembly.

With reference to FIGS. 1 and 2, the front corner assembly 12 includes an automotive front steering and suspension system 16 for connecting a wheel unit 18 to the vehicle body within the wheel well 14, as described below. The steering and suspension system 16 may take on any known or hereafter developed architecture, including independent or dependent suspension, active or passive suspension, leaf spring, twist-beam or coil spring suspension, wishbone, trailing-arm or multi-link suspension, etc. As shown, the steering and suspension system 16 includes a tie rod 20 connected, at one end, to the knuckle steer arm of a steering knuckle 22 and, at an opposing end, to a steering center link of a rack-and-pinion steering system (not shown). To provide vehicle braking functionality, a front disk-brake assembly, represented herein by a caliper 24 seated on the perimeter of brake rotor 26, is connected to the steering knuckle 22. A hub-and-bearing assembly 28 rotatably couples the brake rotor 26 to the steering knuckle 22, whereas the caliper 24 is rigidly mounted directly to the knuckle 22 body via bolts fed into caliper support arms. A dust cover (or "splash shield") 30 is interposed between the knuckle 22 and the brake rotor 26 to protect the brake system components from road debris and water. The suspension system 16 also includes a lower control arm 32 that is pivotably connected, at one end, to the steering knuckle 22 and, at an opposing end, to a chassis portion of the motor vehicle's 10 body.

Wheel unit 18 of FIGS. 1 and 2 is generally composed of a composite synthetic-rubber tire 34 circumscribing a multi-hub wheel assembly, designated generally at 36. Irrespective of tire type, whether it be all-season, all-terrain, off-road, low profile, snow, mud, etc., the tire 34 may take on a multi-layer ring-shaped form with an outer tread that enables better traction and vehicle handling. A typical pneumatic radial tire, for example, includes a rubber tread overlaying metallic belts and a main carcass with inextensible beads that seal to the wheel assembly 36. The tire 34 may be provided with a conventional Schrader-type check valve for regulating tire pressure. As is common, the tire 34 can mount directly onto the wheel assembly 36 and hold air without the need for a separate inner tube.

To manage external loading conditions, such as a shallow offset frontal load, and control deflection of the front corner assembly 12 during such loading, the wheel unit 18 is provided with a multi-hub wheel assembly 36 comprising an intermediate hub 38 nested inside an outer wheel 40. The multi-hub wheel assembly 36, which may be a multi-part construction (FIG. 3) or an integrally formed unit (FIG. 4), is mounted onto lugs 29 of the hub-and-bearing assembly 28 for common rotation with the rotor 26. This multi-hub wheel assembly 36 provides functional and structural support for the tire 34 during operation of the motor vehicle 10. It should be appreciated that the aesthetic characteristics as well as the individual and relative dimensions of the multi-hub wheel assembly 36 components can vary from that which are shown in the drawings.

Figure 3:
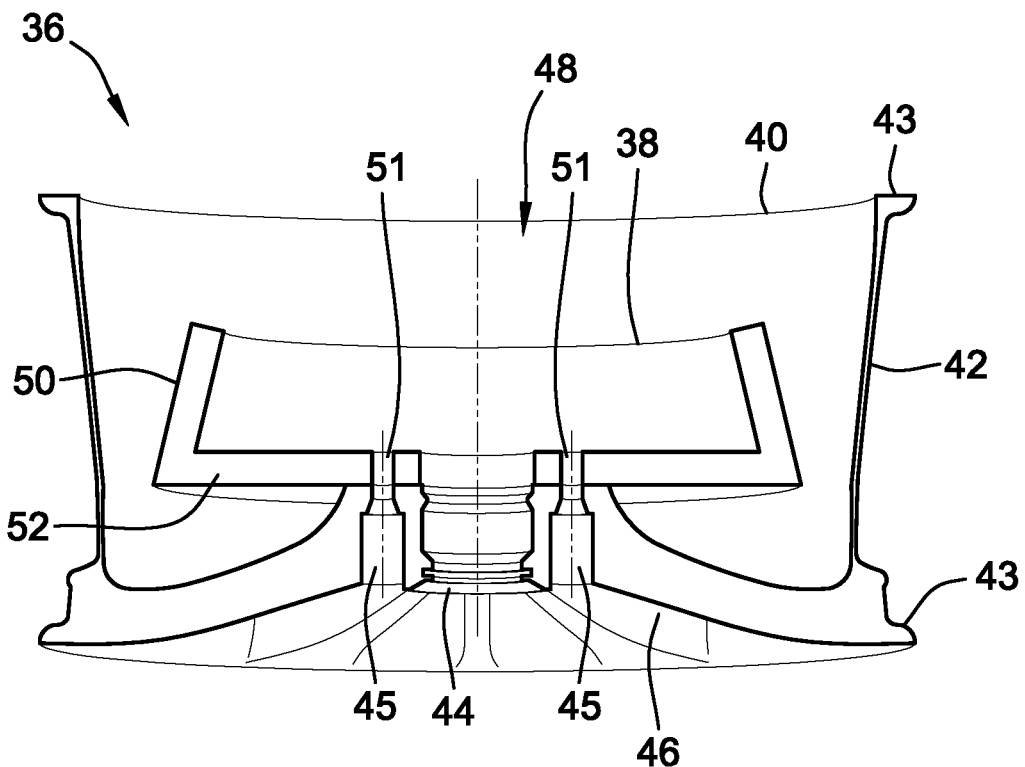
FIG. 3 is a sectional plan-view illustration of the representative multi-hub wheel assembly of FIG. 2.

Turning to FIG. 3, the rigid outer wheel 40 includes an annular outer rim well 42 that is attached to a central hub 44, e.g., via a rim star 46, to define a hollow core, designated generally at 48. At its lateral edges, the rim well 42 is terminated by opposing rim flanges 43. These rim flanges 43 serve for sealing and mounting of the tire 34 which has been pulled, pressed, or otherwise fitted onto the rim well 42. Circumferentially spaced through-holes 45 extend through central hub 44 to receive fastening means, such as lugs 29 of the hub-and-bearing assembly 28, for mounting the outer wheel 40 to the steering and suspension system 16 and, thus, the body of the vehicle 10. The annular outer rim well 42 projects generally orthogonally from the outer periphery of the rim star 46 in an inboard direction, i.e., into the wheel well. As shown, the outer wheel 40—rim well 42, central hub 44 and rim star 46—is cast, forged or otherwise integrally formed as a single-piece unitary structure. Optional alternative designs may comprise an outer wheel that is fabricated from two or more separate components that are subsequently joined together. It should be appreciated that the "starred" or "spoked" design of the rim star 46 is non-limiting in nature; as such, the rim star 46 can take on other functional and aesthetic designs without departing from the scope of this disclosure.

Figure 4:
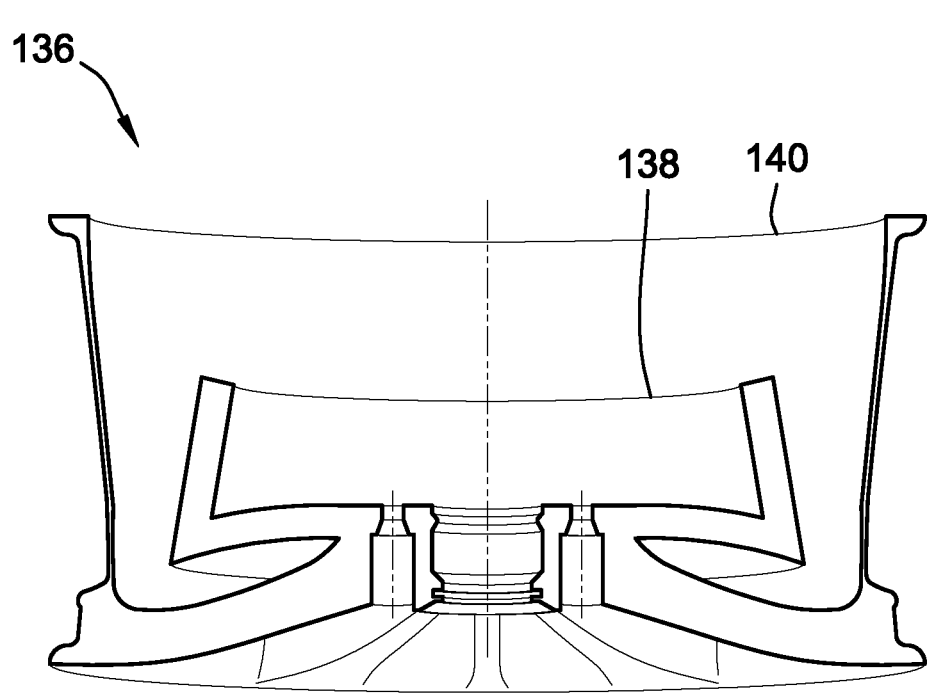
FIG. 4 is a sectional plan-view illustration of another multi-hub wheel assembly for a motor vehicle in accordance with aspects of the present disclosure.

Concentric with the outer wheel 40 is a rigid intermediate hub 38 comprising an annular deflection rim 50 that is attached to a toroidal mounting base 52. In the illustrated example, the deflection rim 50 of the intermediate hub 38 extends continuously around the outer periphery of the mounting base 52, projecting therefrom at an oblique angle in an inboard direction. This angle of projection can be modified, for example, to provide different deflection characteristics during external loading. The mounting base 52 can be a disk-shaped toroid, as seen in FIG. 3, a concave (semispherical) toroid, as seen in FIG. 4, or take on other desired shapes and sizes depending, for example, on the intended application of the wheel unit 18. What's more, the deflection rim 50 may be non-continuous in nature, for example, taking on a segmented form with spaced partitions. Likewise, the mounting base 52 may be fabricated with venting slots for improved cooling or support ribs for increased strength.

Circumferentially spaced through-holes 51 of FIG. 3 extend through the mounting base 52 and, when properly positioned, align with the through-holes 45 of the central hub 44. In this regard, these through-holes 51 receive fastening means, such as lugs 29 of the hub-and-bearing assembly 28, for mounting the intermediate hub 38 to the outer wheel 40 and the steering and suspension system 16. Once properly mounted, the deflection rim 50 of the intermediate hub 38 at least partially circumscribes one or more of the suspension components of the motor vehicle 10, as seen in FIG. 2. As shown, the intermediate hub 38—rim 50 and mounting base 52—is cast, forged or otherwise integrally formed as a single-piece unitary structure. In this regard, a multi-hub wheel assembly 136 may comprise, or consist essentially of, an intermediate hub 138 and an outer wheel 140 that are integrally formed as a single-piece unitary structure, as seen in FIG. 4. Alternative designs may comprise an intermediate hub that is fabricated from two or more separate components that are subsequently joined together.

According to the illustrated example, the intermediate hub 38 is mounted inside the hollow core 48 of the outer wheel 40, interposed between the central hub 44 and the hub-and-bearing assembly 28, e.g., to provide additional radial and lateral structural strength to the wheel assembly 36 and to control movement of the wheel unit 18 under external loading. It is desirable, for at least some embodiments, that the outer wheel 40 be fabricated from a first (lower strength) material (e.g., cast aluminum) having a first material strength property, whereas the intermediate hub 38 is fabricated from a second (higher strength) material (e.g., high-strength low-alloy (HSLA) steel) having a second material strength property (e.g., yield strength, ultimate strength, Young's modulus, etc.) that is greater than the first material strength property. This mixed-material configuration helps to better resist and manage external loading conditions, such as a shallow offset frontal load. Additionally, the optimized intermediate hub 38 geometry helps to control directional movement of an externally loaded front corner assembly 12, e.g., guiding the assembly 12 in an outboard direction aft and away from the motor vehicle's 10 passenger compartment.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A wheel assembly for a motor vehicle, the motor vehicle including a vehicle body, a tire, and a suspension component mounted to the vehicle body, the wheel assembly comprising:

an outer wheel with a rim well attached to a central hub to define a hollow core, the central hub being configured to mount on the suspension component of the motor vehicle, and the rim well being configured to mount thereon the tire; and an intermediate hub attached to the outer wheel and including a deflection rim attached to a mounting base, the intermediate hub being configured to mount inside the hollow core of the outer wheel interposed between the central hub and the suspension component, the deflection rim being configured to at least partially circumscribe the suspension component of the motor vehicle.

2. The wheel assembly of claim 1, wherein the deflection rim of the intermediate hub projects at an oblique angle from the mounting base.

3. The wheel assembly of claim 1, wherein the suspension component includes a steering knuckle, a control arm attaching the steering knuckle to the vehicle body, and a hub-and-bearing assembly configured to attach the steering knuckle to the outer wheel and the intermediate hub, and wherein the deflection rim of the intermediate hub is configured to circumscribe the hub-and-bearing assembly.

4. The wheel assembly of claim 1, wherein the mounting base of the intermediate hub is a disk-shaped toroid or a concave toroid.

5. The wheel assembly of claim 1, wherein the suspension component includes a hub-and-bearing assembly with a plurality of lugs onto which mounts the central hub of the outer wheel, and wherein the mounting base includes a plurality of apertures each configured to receive therethrough a respective one of the lugs and thereby mount the intermediate hub to the suspension component.

6. The wheel assembly of claim 1, wherein the rim well is attached to the central hub via a rim star, the rim well projecting inboard from the outer periphery of the rim star.

7. The wheel assembly of claim 6, wherein the rim well, the central hub and the rim star are integrally formed as a single-piece unitary structure.

8. The wheel assembly of claim 1, wherein the deflection rim and the mounting base of the intermediate hub are integrally formed as a single-piece unitary structure.

9. The wheel assembly of claim 1, wherein the outer wheel and the intermediate hub are integrally formed as a single-piece unitary structure.

10. A wheel assembly for a motor vehicle, the motor vehicle including a vehicle body, a tire, and a suspension component mounted to the vehicle body, the wheel assembly comprising:

an outer wheel with a rim well attached to a central hub to define a hollow core, the central hub being configured to mount on the suspension component of the motor vehicle, and the rim well being configured to mount thereon the tire; and an intermediate hub attached to the outer wheel and including a deflection rim attached to a mounting base, the intermediate hub being configured to mount inside the hollow core of the outer wheel interposed between the central hub and the suspension component, wherein the deflection rim is annular and extends continuously around an outer periphery of the mounting base.

11. The wheel assembly of claim 10, wherein the deflection rim of the intermediate hub projects at an oblique angle from the mounting base.

12. The wheel assembly of claim 10, wherein the mounting base of the intermediate hub is a disk-shaped toroid or a concave toroid.

13. The wheel assembly of claim 10, wherein the rim well and the central hub of the outer wheel are integrally formed as a single-piece unitary structure.

14. The wheel assembly of claim 10, wherein the deflection rim and the mounting base of the intermediate hub are integrally formed as a single-piece unitary structure.

15. The wheel assembly of claim 10, wherein the outer wheel and the intermediate hub are integrally formed as a single-piece unitary structure.

16. A wheel assembly for a motor vehicle, the motor vehicle including a vehicle body, a tire, and a suspension component mounted to the vehicle body, the wheel assembly comprising:

an outer wheel with a rim well attached to a central hub to define a hollow core, the central hub being configured to mount on the suspension component of the motor vehicle, and the rim well being configured to mount thereon the tire; and an intermediate hub attached to the outer wheel and including a deflection rim attached to a mounting base, the intermediate hub being configured to mount inside the hollow core of the outer wheel interposed between the central hub and the suspension component, wherein the outer wheel is fabricated from a first material having a first material strength property, and the intermediate hub is fabricated from a second material having a second material strength property that is greater than the first material strength property.

17. The wheel assembly of claim 16, wherein the deflection rim of the intermediate hub projects at an oblique angle from the mounting base.

18. The wheel assembly of claim 16, wherein the mounting base of the intermediate hub is a disk-shaped toroid or a concave toroid.

19. The wheel assembly of claim 16, wherein the rim well and the central hub of the outer wheel are integrally formed as a single-piece unitary structure.

20. The wheel assembly of claim 16, wherein the deflection rim and the mounting base of the intermediate hub are integrally formed as a single-piece unitary structure.

* * * * *